(12) United States Patent
Chen et al.

(10) Patent No.: US 8,442,563 B2
(45) Date of Patent: May 14, 2013

(54) AUTOMATED TEXT-BASED MESSAGING INTERACTION USING NATURAL LANGUAGE UNDERSTANDING TECHNOLOGIES

(75) Inventors: Chun-Yang Chen, Holbrook, NY (US); Russell Gulli, Mount Sinai, NY (US); Christopher Passaretti, Smithtown, NY (US); Chingfa Wu, Smithtown, NY (US); Stephen Buckley, Stony Brook, NY (US)

(73) Assignee: Avaya Inc., Basking Ridge, NJ (US)

( * ) Notice: Subject to any disclaimer, the term of this patent is extended or adjusted under 35 U.S.C. 154(b) by 495 days.

(21) Appl. No.: 12/636,163

(22) Filed: Dec. 11, 2009
(Under 37 CFR 1.47)

(65) Prior Publication Data
US 2010/0151889 A1  Jun. 17, 2010

Related U.S. Application Data

(60) Provisional application No. 61/121,717, filed on Dec. 11, 2008.

(51) Int. Cl.
*H04W 4/00* (2009.01)

(52) U.S. Cl.
USPC .............. 455/466; 455/412.1; 455/412.2; 455/414.1

(58) Field of Classification Search .......... 709/9, 10, 709/14; 455/466, 412.1, 412.2, 414.1
See application file for complete search history.

(56) References Cited

U.S. PATENT DOCUMENTS

| | | | |
|---|---|---|---|
| 2004/0107088 A1* | 6/2004 | Budzinski | 704/10 |
| 2005/0027536 A1 | 2/2005 | Matos et al. | |
| 2005/0080628 A1* | 4/2005 | Kuperstein | 704/270.1 |
| 2007/0239837 A1* | 10/2007 | Jablokov et al. | 709/206 |
| 2008/0208586 A1* | 8/2008 | Ativanichayaphong et al. | 704/270.1 |
| 2008/0219429 A1 | 9/2008 | Mandalia et al. | |
| 2008/0256200 A1 | 10/2008 | Elliston | |
| 2009/0076917 A1* | 3/2009 | Jablokov et al. | 705/14 |
| 2009/0089181 A1* | 4/2009 | Mathis, Jr. | 705/26 |
| 2009/0209239 A1 | 8/2009 | Montesdeoca | |

FOREIGN PATENT DOCUMENTS

| | | |
|---|---|---|
| KR | 10-2002-0010226 | 2/2002 |
| KR | 10-2002-0042248 | 6/2002 |
| KR | 10-2006-0014043 | 2/2006 |

OTHER PUBLICATIONS

Written Opinion of the International Searching Authority from corresponding PCT application PCT/US2009/067695.

* cited by examiner

*Primary Examiner* — Kamran Afshar
*Assistant Examiner* — Khalid Shaheed
(74) *Attorney, Agent, or Firm* — Anderson Gorecki & Rouille LLP

(57) ABSTRACT

Automated text-based messaging interaction using natural language understanding technologies enables text-based messages to be received from users and interpreted by a self-service application platform so that the self-service application platform can respond to the text-based messages in an automated manner. The characters and strings of characters contained within the text message are interpreted to extract words, which are then processed using a natural language understanding engine to determine the content of the text-based message. The content is used to generate a response message from static and/or dynamic grammars to automate the process of interacting with a user via text-based messages. Multiple text-based message formats are supported, including text messages transmitted using Short Messaging Service (SMS), instant messaging, chat, and e-mail.

14 Claims, 3 Drawing Sheets

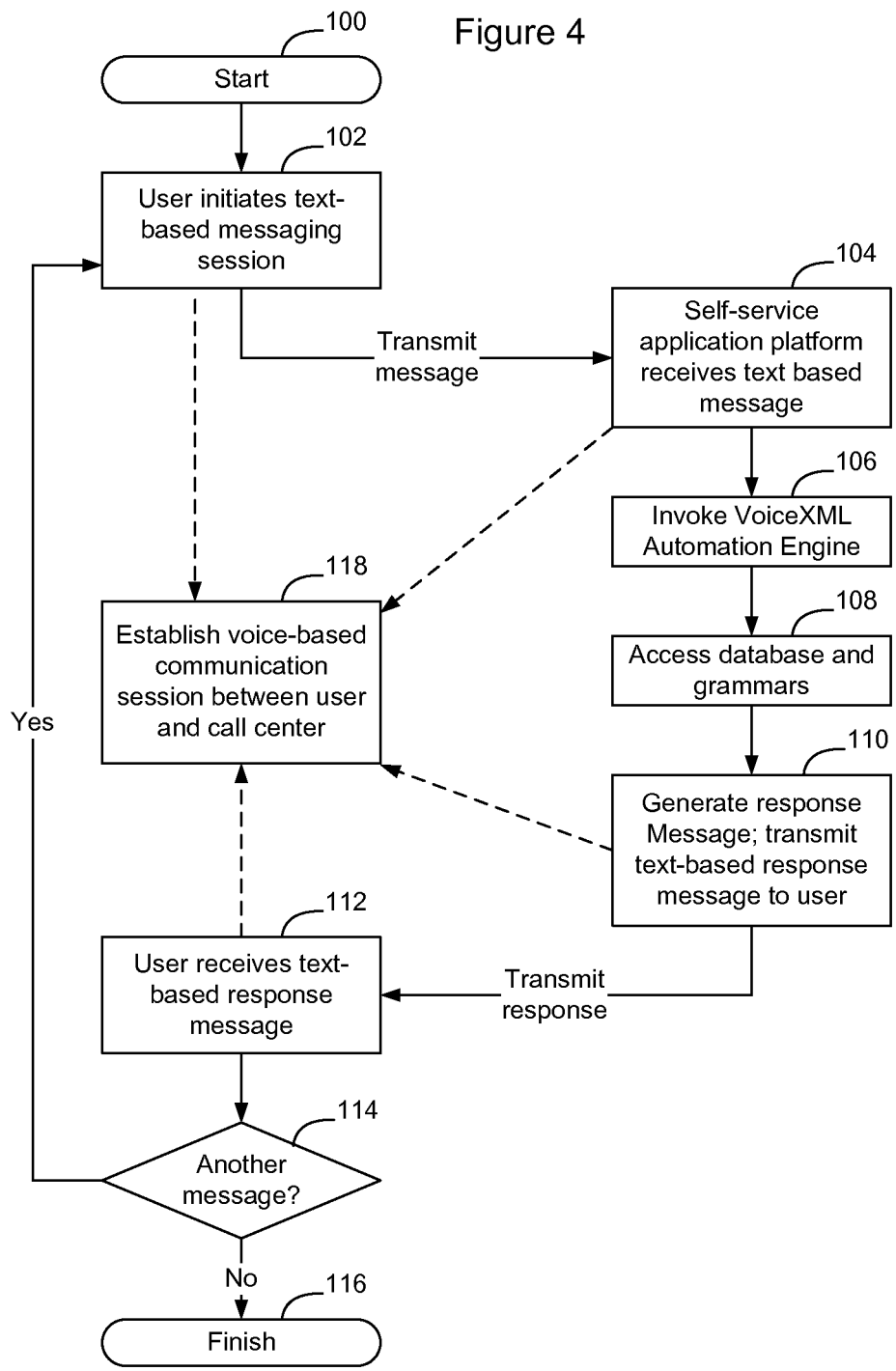

AUTOMATED TEXT-BASED MESSAGING INTERACTION USING NATURAL LANGUAGE UNDERSTANDING TECHNOLOGIES

CROSS-REFERENCE TO RELATED APPLICATIONS

This application claims priority to U.S. Provisional Patent Application No. 61/121,717, filed Dec. 11, 2008, entitled "Automated Text Messaging Using Natural Language Understanding Technologies", the content of which is hereby incorporated herein by reference.

BACKGROUND OF THE INVENTION

1. Field of the Invention

The present invention relates to communication systems and, more particularly, to automated text-based messaging interaction using natural language understanding technologies.

2. Description of the Related Art

Contact centers are used in many instances to sell products or to provide support for previously sold products. In a typical contact center, a customer will make a call and be prompted to enter information to enable that caller to be routed to an appropriate sales or support agents. Contact centers enable companies to provide information to customers and, as such, are a valuable asset to the company and to the company's customers. However, hiring and managing people to take calls in the contact center may be expensive. Accordingly, self-service application platforms have been developed that enable aspects of customer service operations to be automated, so that customers or other individuals may interact with a computerized system to obtain information without talking to an agent.

Generally, when a customer calls an automated system of this nature, the customer will be prompted by a self-service application platform to input particular information, which allows the self-service application platform to provide the customer with relevant information and generally interact with the customer. For example, where the customer calls the self-service application using a touch-tone phone, the user may provide input by pressing keys to generate DTMF (Dual Tone Multi Frequency) signals. Alternatively, an Interactive Voice Response system may be used to prompt the user to speak particular words, and the self-service application platform will then use voice recognition software to obtain input from the user. Generally, the system will play a prompt and request the user to enter some information. When the user enters the information (either by speaking or via their keypad) the system will query a database, host, etc., and respond to the caller with some information (typically based on the initial response from the caller). This process may iterate several times.

As technology has developed, larger numbers of people have begun using text-based messaging as a preferred form of communication. Various forms of text-based messaging have been developed, such as chat, instant messaging (IM), messages transmitted using Short Messaging Service (SMS) which are commonly referred to as "text messages", and email. Recognizing this trend, contact centers have added customer agents that are able to communicate with customers via text messaging such as via chat, IM, SMS, etc.

U.S. Patent Application Publication No. 2008/0256200 teaches a voice application developed utilizing a voice application tool that is also operable to provide application interaction capabilities to text clients. The voice application and corresponding text application in this published application is an Interactive Voice Response system which provides users with menus of possible options and allows the users to enter selection using either voice or via text message. For example, "for English, press or say ONE". As self-service application platforms continue to develop, it would be advantageous to provide an alternative way for users to interact with these types of automated platforms.

SUMMARY OF THE INVENTION

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

Automated text-based messaging interaction using natural language understanding technologies enables text-based messages to be received from users and interpreted by a self-service application platform so that the self-service application platform can respond to the text-based messages in an automated manner. The characters and strings of characters contained within the text message are interpreted to extract words, which are then processed using a natural language understanding engine to determine the content of the text-based message. The content is used to generate a response message from static and/or dynamic grammars to automate the process of interacting with a user via text-based messages. Multiple text-based message formats are supported, including text messages transmitted using Short Messaging Service (SMS), instant messaging, chat, and e-mail.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 4 is a flow chart illustrating an example automated process that may be used to enable a user to interact with a self-service application platform using text-based messages according to an embodiment of the invention.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
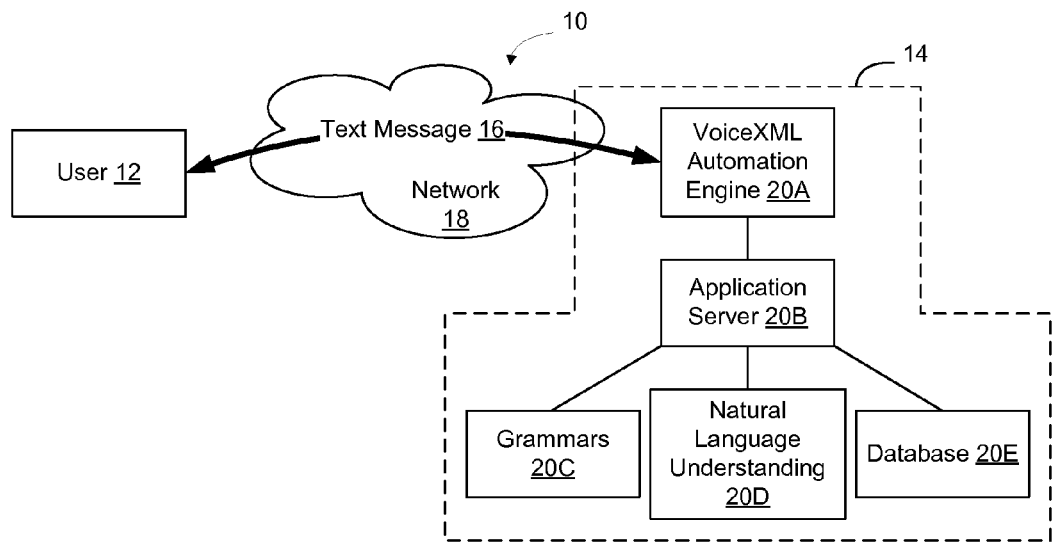
FIG. 1 is a functional block diagram of an example system enabling users to have access to a self-service application platform using text-based messages according to an embodiment of the invention.

FIG. 1 illustrates an example of a system 10 configured to interface a user 12 with a self-service application platform 14 according to an embodiment of the invention. The user 12 may interact with the self-service application platform in a conventional manner, such as by calling the self-service application platform using a telephone, or may send a text-based message 16 to the self-service application platform. One or more communication networks 18 interconnect the user 12 and the self-service application platform 14. Conventional communication networks include wireless access networks such as cellular networks and wireless data networks (802.11x or 802.16), the public switched telephone network, the Internet, and various other installed communication networks. Myriad communication technologies have been developed to enable people and computers to communicate with each other and the invention is not limited to use with a particular type of network 18, as long as the network is able to carry text-based message 16 between user 12 and the self-service application platform 14.

In FIG. 1, the self-service application platform 14 includes a VoiceXML automation engine 20A implemented using VoiceXML. VoiceXML is the World Wide Web Consortium (W3C's) standardized XML format that specifies interactive voice dialogues between a human and a computer. VoiceXML allows voice applications to be developed and deployed in a way that is analogous to how HTML applications are developed. For example, just as HTML documents are interpreted by a visual web browser, VoiceXML enables voice to be received as input. Implementing the self-service application platform 14 using VoiceXML enables a common interface to be created that may be used for voice-based interaction as well as for text-based interaction.

The VoiceXML automation engine receives input from users via one or more network interfaces designed to receive text-based messages, and optionally voice-based communication sessions, and contains scripts that enable the self-service application platform to provide an interactive interface to the user. The VoiceXML automation engine provides a voice-based interface which allows the user to speak to the self-service application platform. According to embodiment of the invention, the VoiceXML automation engine also enables users to send text-based messages to the self-service application platform and the same VoiceXML automation engine that would be used to provide a voice-based interface to the self-service application platform is used to interpret the text-based messages, so that the user can interact with the self-service application platform via text-based messages.

The VoiceXML automation engine, in this embodiment, includes a text interface written using the W3C VoiceXML language, which is designed to provide an interactive text user interface to the user. The VoiceXML automation engine operates in the same manner as it would if it were providing a voice interface to the user, but instead of providing the user with a voice interface it collects information from the user via text-based messages and provides information to the user via text-based messages. The text-based messages may be used exclusively or may be used as a supplement to a voice-based communication session as discussed in greater detail below.

The VoiceXML automation engine may created using a proprietary implementation of VoiceXML or may be developed using an available VoiceXML interpreter. For example, JVoiceXML is a free VoiceXML interpreter for Java which was created using an open architecture and is platform independent. The current version of JVoiceXML provides an implementation of VoiceXML 2.1, although other versions may be used as well. Other commercially available VoiceXML interpreters may be used to implement the VoiceXML automation engine as well.

The VoiceXML automation engine has a text portal that receives text-based messages and interprets the characters contained in the text-based message (natively or by calling a text recognition process) to determine the user's input. Interpreting the characters contained in the text-based message to determine the words associated with the message is often necessary because of the nature of text-based communication. Text-based messages are typically limited in size to a particular number of characters and, accordingly, many abbreviations have been developed by people who text regularly. For example, the term "IMHO" is commonly used for the phrase "In My Humble Opinion". As another example, the term "LOL" is commonly used for the phrase "Laughing Out Loud". Many other phrases and words have been shortened as well.

Likewise, emoticons have been developed to convey emotion, which may be useful to the self-service application platform. For example, if a person types ":)" the person is conveying that they are happy. Advanced browsers will commonly change this string to its picture form: ☺ . By contrast, if the person is upset, the person may type ":(" which is often automatically changed to ☹ . Many other emoticons exist as well, and particular emoticons may mean different things in different parts of the world. According to an embodiment of the invention, the self-service application platform may respond differently to users depending on the sensed emotion of the user, as conveyed by the user via emoticons. Where a user is unhappy, for example, the self-service application platform may select different responses than where the self-service application platform has no knowledge of the emotional state of the user or understands that the user is happy. Although the information in the grammars may be the same, the way in which the information is conveyed may be different so that the response is more appropriately drafted to account for the current emotional state of the user.

Likewise, text messages frequently contain typographical errors or misspellings which may inhibit direct reading of words from the text-based message. In one embodiment, the VoiceXML automation engine passes the content of the text-based message to a text recognition process which uses the characters and a database of known abbreviations, phrases, misspellings, emoticons, etc. to convert the characters into words.

Once the words of the text-based message have been discerned, a natural language understanding engine 20D parses the words to understand the question presented by the user or the type of information provided and/or requested by the user. Natural Language Understanding uses voice recognition software to determine what words the customer has spoken, and then processes the words to discern what the customer has said. For example, the natural language understanding engine may listen for particular key words, may listen for particular phrases, or use other rules to determine from natural speech what a person is saying. By analyzing the words the natural language understanding is able to discern what question the user is asking or what information the user is requesting, and determine an appropriate response. The natural language understanding process operates on the words of the text-based message to determine what the user has requested in the text-based message. The VoiceXML automation engine will then select one or more grammars from grammar store 20C to create a response text-based message. The VoiceXML automation engine will pass the response text-based message back to user 12. Additional details are provided below in connection with FIG. 3.

Figure 2:
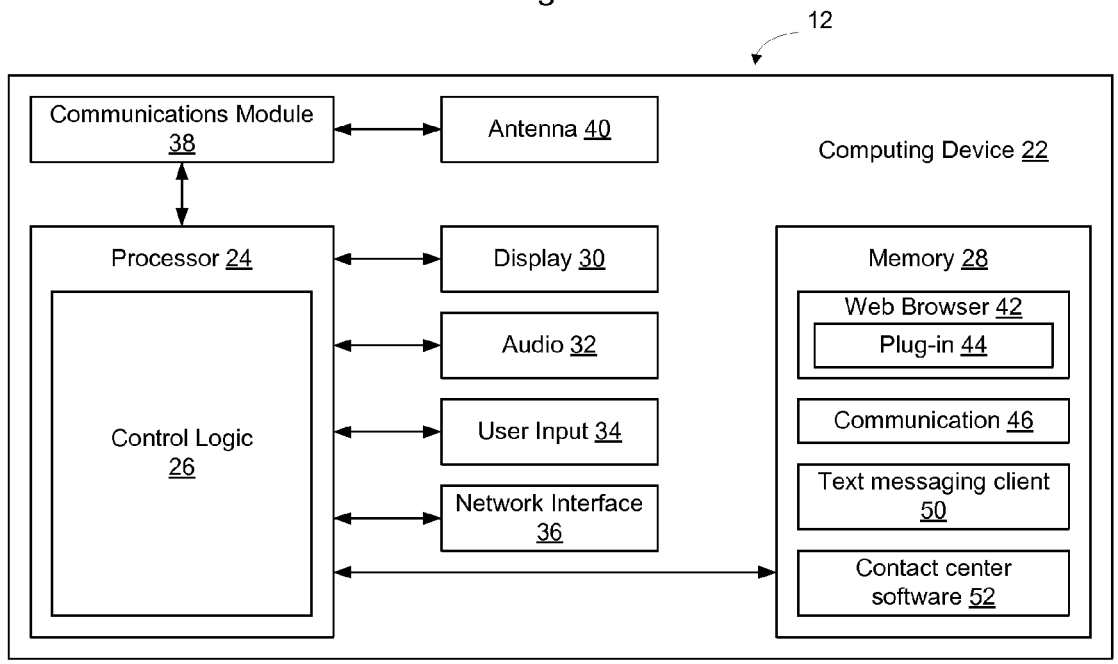
FIG. 2 is a functional block diagram of an example computing device for use by an user to access a self-service application platform using text-based messages.

FIG. 2 shows a computing device 22 that may be used by user 12 to interact with self-service application platform 14. The computing device 22 may be a personal computer, IP telephone, cellular telephone, a personal computer, a handheld computing device such as a personal digital assistant, or another piece of equipment configured to enable a communication session to take place between the customer and a contact center. When the user wishes to access the self-service application platform, the user will use the computing device 22 to generate a text-based message 16 that is transferred over network 18 to the self-service application platform 14.

In the embodiment shown in FIG. 2, the computing device 22 includes a processor 24 containing control logic 26 configured to enable it to process instructions to execute computer program code stored in memory 28 on the computing device. The computing device may be optimized to perform a particular class of actions, like a telephone, or may be a general purpose computer configured to communicate over a public or private data network. The computing device may include features, such as a display 30 and audio transducers 32. The computing device may have one or more user input devices 34 such as a keyboard, keypad, touch pad, stylus, mouse, track ball, or other user entry device. The display 30 may also be equipped with a touch-sensitive screen to enable the display to be used as an input device.

The computing device 22 also includes one or more network interfaces 36 which may be in the form of a communication port or, where the device is a wireless device, may include a communications module 38 and antenna 40. The communications module provides baseband and radio functionality to enable wireless signals to be received and transmitted via antenna 40.

The memory 28 includes software which, when loaded as control logic into processor 24, enables the computing device to perform various functions specified by the software. For example, the computing device 22 may include a web browser 42 optionally with one or more plug-ins 44 to enable the computing device to interact with other computers on the Internet. The computing device may also include communications software 46 to allow the computing device to communicate via the network interface 36 or wireless interface 38/40. Various other software, to control other features of the computing device, may be included as well as would be understood by a person of ordinary skill in the art.

As shown in FIG. 2, the computing device 22, according to an embodiment of the invention, includes a text messaging client 50. The text messaging client works alone or, optionally, in connection with self-service application platform software 52 to generate text-based messages to be transmitted to the self-service application platform.

A self-service application platform may be associated with a contact center having agents that are available to help the user if the self-service application platform is not able to provide sufficient information or if the user decides that it would be preferable to talk to a person rather than a computer. Accordingly, the computing device 22 may include contact center software to enable the user to escalate text based interaction with the self-service application platform to a text or voice based interaction with a live agent at an affiliated call center.

Where the computing device includes contact center software, the contact center software may be used to format the text-based messages to make the text-based messages easier for the self-service application platform to understand. Likewise, the contact center software may interface with the text messaging client to enable the user to use the text messaging client to provide the contact center with information during a voice session with an agent at the contact center. This enables the contact center to request the user to transmit information to the contact center via text-based messaging rather than via DTMF, which may make entering data easier for the user. Although having contact center software loaded on the user device 22 may thus be advantageous in particular situations, the invention is not limited to an embodiment where the computing device uses contact center software.

Figure 3:
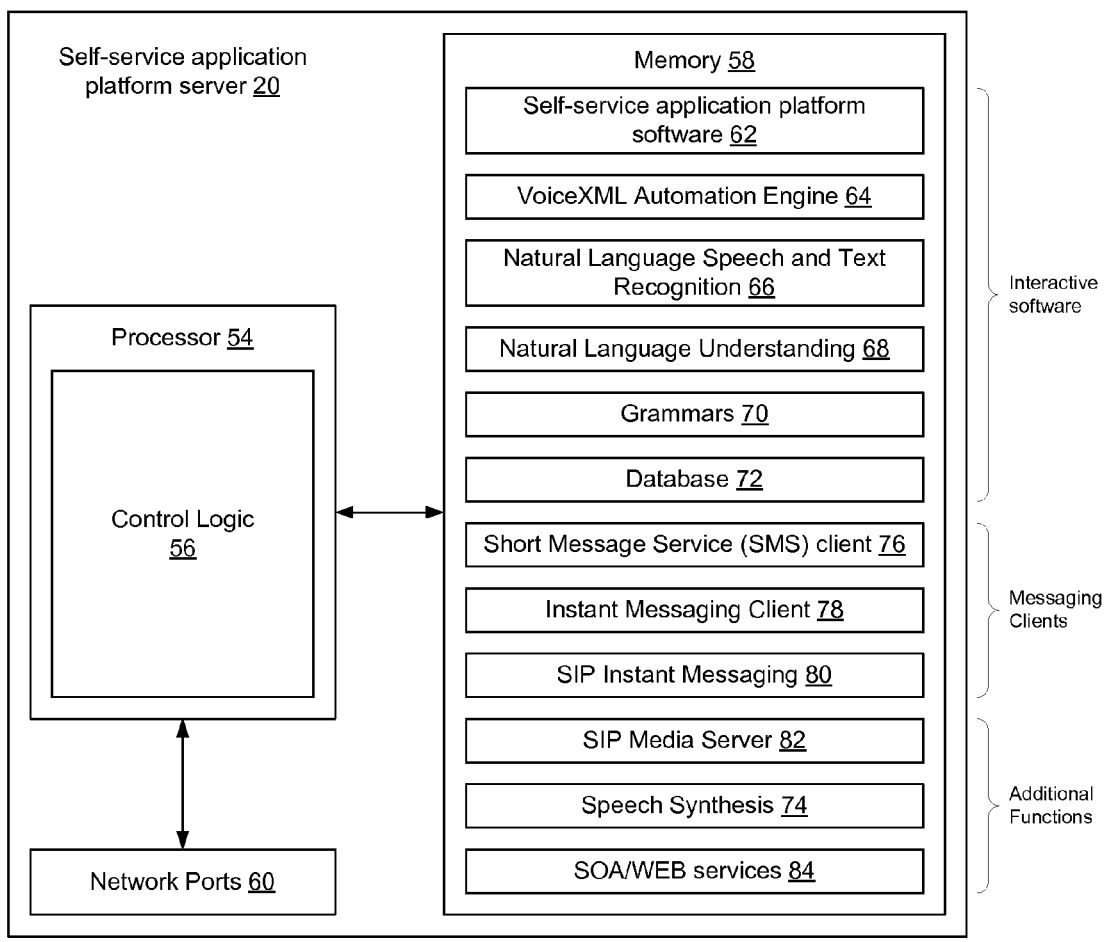
FIG. 3 is a functional block diagram of an example self-service application platform that may receive and automatically respond to text-based messages according to an embodiment of the invention.

FIG. 3 shows a self-service application platform 20 that may be implemented, as discussed above in connection with FIG. 1, as a single server or using multiple servers. Network based applications commonly utilize multiple servers for different functions to scale capacity and for redundancy purposes. FIG. 3 has been illustrated as a single server to facilitate description of the functions performed by the server(s) implementing the self-service application platform. The invention is not limited to an embodiment in which all the functionality is implemented using a single server.

In the embodiment shown in FIG. 3, the server 20 includes a processor 54 containing control logic 56 configured to enable it to process instructions to execute computer program code stored in memory 58. The server may be implemented using a standard computer server. Since servers are well known, the internal components of server 20 have not been shown. In the embodiment shown in FIG. 3, the server includes one or more network ports 60 to enable the server to be connected to network 18.

The memory 58 includes software which, when loaded as control logic into processor 54, enables the server to perform various functions specified by the software. For example, the server 20 may include self-service application platform software 62 containing overall control logic to control the process flow for handling telephone calls and text-based contacts between users and the self-service application platform. Scripts associated with the self-service application platform software define the type of information that is required to be collected from the user and the responses to be provided by the self-service application platform. For example, if the self-service application platform is used by an airline, the self-service application platform software could define a first tier of scripts that would enable the self-service application platform to determine if the person is using the text-based contact to purchase new tickets, check the status of a flight, check the status of lost baggage, or other common inquiries. The scripts would then further define other information that is required to be obtained to enable the self-service application platform to help the customer. For example, if the customer indicated that the purpose of the contact was to check the status of a flight, the scripts may require the self-service application platform to determine whether the flight is domestic or international, the destination, flight number, date, time, etc. If the original text-based message does not contain sufficient information to proceed past a script, the self-service application platform software contains control logic that will enable it to send a reply text-based message to request the required information.

In the illustrated embodiment, memory 58 contains additional software implementing VoiceXML automation engine 64, natural language speech and text recognition 66, natural language understanding 68, grammars 70, and database 72. These software components work with self-service application platform logic to enable the self-service application platform software to process text-based interactions with the users. Likewise, these same components may be used to enable the self-service application platform software to process voice-based interactions with users or hybrid voice/text based interactions. For example, when a text-based message is received from the user, the self-service application platform software will invoke the VoiceXML Automation Engine 64. The VoiceXML Automation Engine uses natural language speech and text recognition 66 along with database 72 to interpret any abbreviated words within the text-based message and uses the natural language understanding to determine what the user has written.

Based on the content of the text-based message, the VoiceXML automation engine causes one or more grammars to be selected. The grammars may be static grammars or may be dynamically populated with information particular to the user's request. An example of a static grammar may be an address or other contact information. An example of a dynamically populated grammar may be created to provide the user with specific information, such as the estimated time of arrival of a particular flight, the user's account balance, etc. The VoiceXML automation engine uses the grammars to create response text-based messages and to take other appropriate actions.

The server thus has interactive software components that enable the self-service application platform to respond to text-based messages from users. The interactive software components are similar to conventional voice-based software components, but utilize a text-based interface rather than a voice-based interface. For example, the VoiceXML automation engine, natural language understanding, and grammars are all configured as normal.

In embodiments of the invention, since the interaction with the user is text-based, the VoiceXML automation engine is not required to use a voice recognition process to recognize words spoken by the user. However, since text-based messages are not necessarily error-free and may be written using numerous types of short-hand ways of expressing common words, the VoiceXML automation engine is configured to convert the characters contained in the text-based messages to words that are understandable by the natural language understanding engine 68. In one embodiment, the VoiceXML automation engine uses natural language speech and text recognition to understand the content of the text-based message from the user to create a message that is able to be used by the natural language understanding 68.

For example, as noted above, text-based messages from users may include adaptations of spelling of words, which has developed to make it easier to type messages using a small keyboard or phone keypad. Likewise, text-based messages commonly omit spaces between words so that the words all run together (e.g. "ThisPatentApp"). Numbers are also commonly used to abbreviate words (e.g. "gr8" for "great"). In foreign language, the use of diacritic marks over vowels may be common in the local language. These types of diacritic marks and other types of punctuation are frequently omitted in text messages, which may complicate understanding the content of the text message. All of these types of adaptations, as well as inadvertent spelling mistakes and typographical errors, require conversion to normal words so that the words may be input to the natural language understanding engine 68. Optionally, the natural language understanding engine 68 may be configured to perform the recognition aspect (converting characters to words), however, and the invention is not limited to an embodiment where these processes are separated.

In addition to interactive software components, the server includes messaging clients to enable it to interact with users on the network. For example, in the illustrated embodiment the contact center server includes a short messaging service (SMS) client 76 designed to receive and transmit text-based messages. The server also includes an instant messaging client 78 designed to receive and transmit instant messages. Instant messaging is different than text messaging, in that instant messaging requires both clients (the user IM client and server IM client) to be open at the same time to enable messages to be exchanged in real time. SMS-based text messages, by contrast, may be stored by a text messaging server on the network until they are able to be delivered. One example of an instant messaging client is a SIP Instant Messaging client 80. A chat session may likewise be used, in which a chat session is started and the VoiceXML automation engine selects inputs to be passed to the user in the chat session using grammars 70.

The self-service application platform server may also have other components to enable sessions to be established between the self-service application platform and users. For example, the self-service application platform may include a SIP media server 82 to enable the self-service application platform server to participate in Session Initiation Protocol (SIP) based communication sessions on the network. SIP is a common signaling protocol used to establish Voice over Internet Protocol (VoIP) based communication sessions such as voice telephony, video telephony, and to establish presence on the network.

The VoiceXML automation engine 64 may provide a voice interface to the self-service application platform for use where users would prefer to interact using voice rather than text-based messages. A speech synthesis module 74 may be used in connection with this embodiment to enable the grammars to be synthesized to speech to be output as audio on voice-based communication sessions. As noted above, where the user and self-service application platform interact via voice, the text-based capabilities of the system may be used as well to collect input from the user during the voice-based communication session.

The self-service application platform server may also include a SOA/WEB based service module to enable computer-to-computer transactions to be handled by the self-service application platform. Web Services enable computers to interact with each other over networks in a Service Oriented Architecture (SAO) based manner and, hence, SOA/WEB software enables the self-service application platform to respond to automated requests from other computers. For example, in cloud computing the self-service application platform may provide services to other applications on the network to enable the self-service application platform to be used as a resource for other applications on the network.

The use of natural language understanding, in this embodiment, allows the communication between the network services to be simplified, since the other network services do not need to follow a particular format when interacting with the self-service application platform. Rather, the other network services can simply send a text-based message to the self-service application platform. The natural language understanding components of the self-service application platform will read the text-based message to determine the content of the text-based message. Hence, in one embodiment the use of natural language understanding may be used to facilitate web service interaction as well by enabling format agnostic text-based messaging between the web services.

FIG. 4 is a flow chart illustrating an example exchange that may occur between the user and the self-service application platform. As shown in FIG. 4, at the start (100), the user initiates a text-based messaging session with the self-service application platform (102). The self-service application platform may also initiate the exchange, for example by sending the user a text-based message providing them with information and offering to provide additional information upon request. The user will then transmit the message to the self-service application platform.

Upon receipt (104), the self-service application platform will invoke the VoiceXML Automation engine (106) which will either natively decipher the text contained in the text-based message or call one or more services, such as the natural language speech and text recognition and natural language understanding processes, to determine how to respond to the text-based message. One or more static and/or dynamic grammars (108) will then be used to generate a response message (110) that is transmitted to the user.

When the user receives the text-based response message, the user can determine whether to continue interacting with the self-service application platform via text-based messaging (114) or decide to end text-based interaction with the self-service application platform (116). If the user elects to continue text-based interaction, the user may generate another text-based message and forward the text-based message to the contact center. The process may iterate multiple times until the user determines that additional text-based communication is not required (116) or the self-service application program ends the session.

At any point during this process the user may decide to establish a voice-based communication session between the user and a contact center associated with the self-service application platform (118). Likewise, the self-service application platform may have one or more scripts which cause the self-service application platform to notify the associated contact center to alert the contact center that a live agent should contact the user. Accordingly, the contact center may initiate a voice-based communication session or may request that the user initiate a voice-based communication session in one of the transmitted text-based response messages.

According to an embodiment of the invention, an interactive voice response system is configured to enable information to be obtained by customers using text messaging rather than or in addition to via telephone. In operation, text-based messages are processed by a self service (automated response) system such as a Media Application Server/Interactive Communications Portal (MAS/ICP) available from Nortel Networks™ rather than a real person. When a text-based message is received, the text-based message will be sent to an application to process the message to determine what information is being requested. Applications of this nature are used in interactive voice response systems which take the output of the voice recognition software and analyze the words to determine the requested information. The self service system can utilize the same application that it uses to process a voice call to process the chat session. Alternatively, a different application may be written to accommodate differences in how people write verses how they speak.

As an example of such an application, the self service system might utilize a VoiceXML application which executes on a VoiceXML automation engine and uses Natural Language Understanding technologies to automate the text-based session. A self service application with its grammars and business logic can be used for both voice and text-based dialogs. Alternatively, a customer could maintain either a separate application and re-use the same grammars, or re-use the same application with different grammars, or have a different application with different grammars.

Once the VoiceXML automation engine application has interpreted the customer's initial text-based message, the VoiceXML automation engine application may prompt the user for additional information by return text-based message. The user can then respond to the return text-based message with another text-based message containing the information requested by the VoiceXML automation engine application. Whenever a text-based message is received by the VoiceXML automation engine application, the VoiceXML automation engine application will use natural language understanding to determine what information was given or requested. Note that the natural language understanding can be constrained by a grammar in a manner like existing speech technologies, where the grammar defines the rules that can be spoken. In this case the grammar is defining the rules that can be typed via a chat session. After the meaning or interpretation is determined, that information is processed by the VoiceXML automation engine in the same way that a standard voice self service application would process the information. The VoiceXML automation engine queries a database, host, etc. to process the information and sends a response via text-based message to the user. The VoiceXML automation engine application and user may engage in several dialogs until the user has been provided with the requested information. At any time during the process the user may request to talk or text directly with a customer agent rather than with the VoiceXML automation engine application.

In addition to generating text responses, the VoiceXML automation engine application may generate other types of responses such as providing the user with links to a web page, etc. Thus, the invention is not limited to a system that generates the same type of text response as was received from the customer, as any multimodal device can be used to disseminate information. Thus, for example, the system may initiate a telephone call to the user in response to receiving a text-based message request, may send the customer an e-mail with the requested information, or may generate another type of response to the customer's text inquiry.

Although particular modules and pieces of software have been described in connection with performing various tasks associated with automating text-based messaging interaction between a user and a contact center, the invention is not limited to this particular embodiment as many different ways of allocation functionality between components of a computer system may be implemented. Thus, the particular implementation will depend on the particular programming techniques and software architecture selected for its implementation and the invention is not intended to be limited to the one illustrated architecture.

It should be understood that all functional statements made herein describing the functions to be performed by the methods of the invention may be performed by software programs implemented utilizing subroutines and other programming techniques known to those of ordinary skill in the art. The software may be implemented as a set of program instructions configured to operate in control logic on a network element that are stored in a computer readable memory within the network element and executed on a microprocessor. However, it will be apparent to a skilled artisan that all logic described herein also can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof Programmable logic can be fixed temporarily or permanently in a tangible computer-readable medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of automated text-based messaging interaction using natural language understanding technologies between a user and a self-service application platform, the method comprising the steps of:

receiving, by the self-service application platform, a text-based message from the user, the self-service application platform interfacing the user to a contact center, the text based message being addressed to the contact center;

interpreting characters of the text-based message, by the self-service application platform, to determine words associated with the characters contained in the text-based message;

using natural language understanding, by the self-service application platform, to determine an understanding of a content of the text-based message from the words;

selecting, by the self-service application platform, one or more grammars based on the understanding to formulate a text-based response message; and transmitting the text-based response message to the user, the text-based response message being addressed to the user;

wherein the self-service application platform is a text-based VoiceXML (eXtensible Markup Language) self-service application platform; and wherein the step of using natural language understanding comprises the step of parsing normal speech-based text patterns contained within the text-based message to discern information contained in the text-based message without requiring the text-based message to conform with a format specific to the text-based VoiceXML self-service application platform.

2. The method of claim 1, wherein the text-based message is an instant message, and wherein the step of receiving is implemented using an instant messaging client.

3. The method of claim 1, wherein the text-based message is a text message, and wherein the step of receiving is implemented using a Short Messaging Service (SMS) client.

4. The method of claim 1, wherein the text-based message is part of a chat session between the user and the self-service application platform, and wherein response messages from the self-service application platform within the chat session are automatically generated without the intervention of a human agent.

5. The method of claim 1, wherein the step of interpreting characters of the text-based message comprises expanding abbreviations and acronyms contained within the text-based message.

6. The method of claim 5, wherein the step of interpreting characters of the text-based message comprises using the characters to key into a database of abbreviations and acronyms commonly used in text-based messaging.

7. The method of claim 5, wherein the abbreviations and acronyms include sets of letters representing phrases of multiple words.

8. The method of claim 1, wherein the step of interpreting characters of the text-based message comprises fixing misspellings contained within the text-based message.

9. The method of claim 1, wherein the step of interpreting characters of the text-based message comprises the steps of recognizing emoticons and interpreting the emoticons to determine an emotional state of the user.

10. The method of claim 9, further comprising the step of using the determined emotional state when selecting the one or more grammars to formulate the text-based response message.

11. The method of claim 9, further comprising the step of initiating a voice-based session with the user based on the determined emotional state of the user.

12. The method of claim 1, wherein the step of using natural language understanding comprises parsing normal speech-based text patterns contained within the text-based message to discern information contained in the text-based message without requiring the text-based message to conform with a format specific to the self-service application platform.

13. The method of claim 1, wherein the self-service application platform is written using VoiceXML.

14. A text-based VoiceXML (eXtensible Markup Language) self-service application platform, comprising:

one or more processors; and a non-transitory computer-readable memory containing data and instructions which, when loaded as control logic into the one or more processors of a computer system, causes the computer system to implement:

a VoiceXML automation engine configured to receive text-based messages from a user, the self-service application platform interfacing the user to a contact center, the text based message being addressed to the contact center;

a natural language speech and text recognition process to interpret characters of the text-based message to determine words associated with the characters contained in the text-based message; and a natural language understanding process to determine an understanding of a content of the text-based message from the words;

wherein the VoiceXML automation engine uses the content of the text-based message determined using the natural language understanding process to select one or more grammars to formulate a text-based response message and transmit the text-based response message to the user, the text-based response message being addressed to the user; and wherein the natural language understanding process parses normal speech-based text patterns contained within the text-based message to discern information contained in the text-based message without requiring the text-based message to conform with a format specific to the text-based VoiceXML self-service application platform.

* * * * *